United States Patent

[11] 3,584,227

[72] Inventor Donald J. Matsas
 12 Carpenter Road, Wayland, Mass. 01778
[21] Appl. No. 877,114
[22] Filed Nov. 17, 1969
[45] Patented June 8, 1971

[54] SCANNER COMPRISING A LIGHT CONDUCTING ELEMENT LEADING TO A PHOTOCELL REMOTE FROM THE OPTIC AXIS
14 Claims, 3 Drawing Figs.

[52] U.S. Cl..................................................... 250/227, 250/239
[51] Int. Cl..................................................... G02b 5/14, H01j 5/02, H01j 39/12
[50] Field of Search........................................... 250/239, 227, 216

[56] References Cited
UNITED STATES PATENTS
3,247,391 4/1966 Ogle et al...................... 250/239X
3,334,236 8/1967 Bacon .......................... 250/227X Primary Examiner—James W. Lawrence
Assistant Examiner—T. N. Grigsby
Attorney—Abbott Spear ABSTRACT: A reflex scanner is disclosed having a lens system with at least one lens by which light is directed against a target area and reflected back through the lens system and with a second lens focusing reflected light on one end of a light-conducting element whose other end is optically coupled to a light sensor.

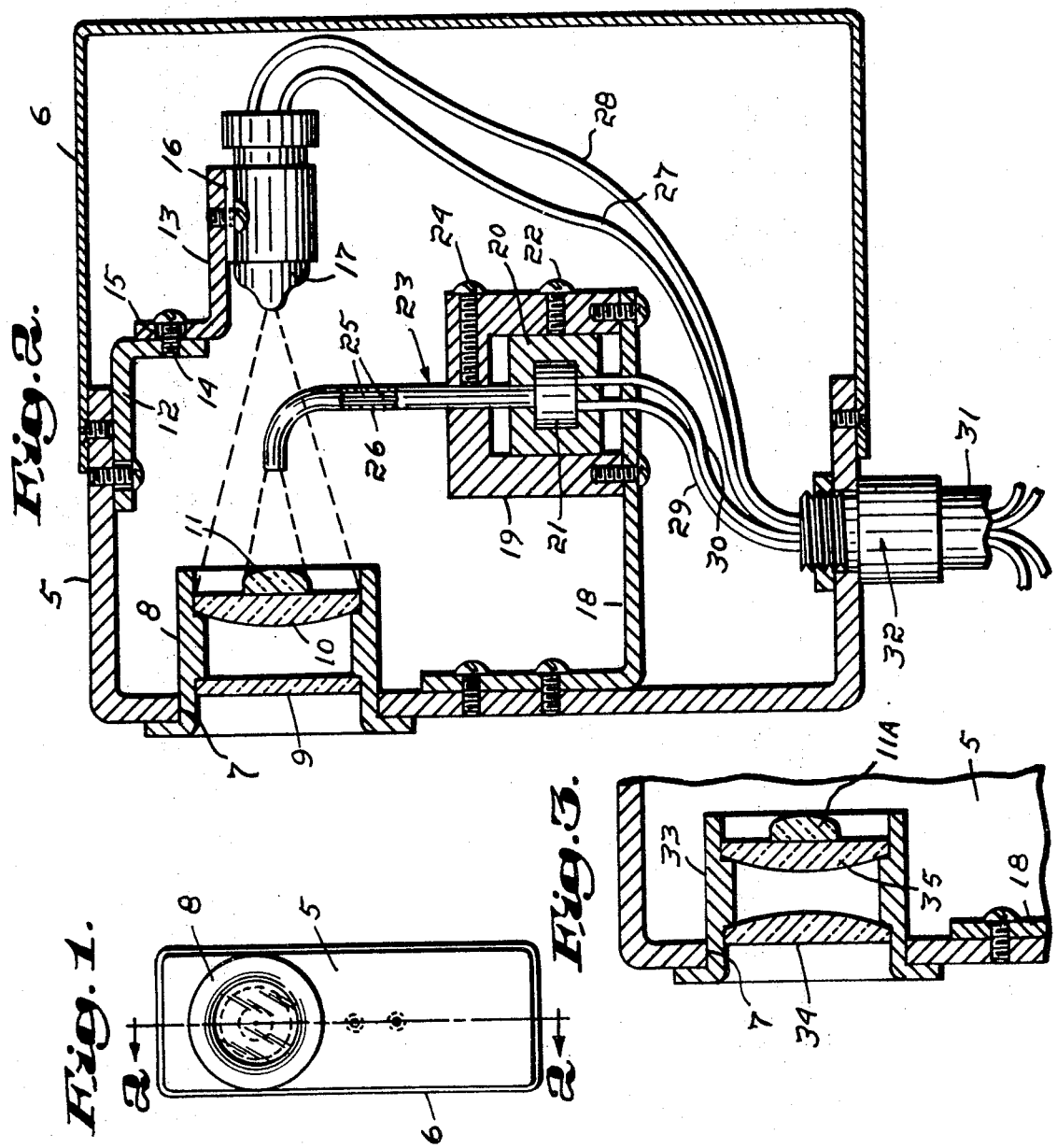

SCANNER COMPRISING A LIGHT CONDUCTING ELEMENT LEADING TO A PHOTOCELL REMOTE FROM THE OPTIC AXIS

The present invention relates to reflex scanners utilizing light-conducting elements to transmit reflected light to the light sensing means.

A reflex scanner has a housing provided with a lens through which light from a source within the housing is directed to a target. A beam of light is reflected from the target back through the lens to a sensor. In one type of scanner, a mirror is interposed between the lens and the light source to direct the reflected light beam to the sensor which is located outside the optical axis. The lens system may provide that the emitted light is collimated or that it is focused on a small area close to the scanner.

While such scanners have proved satisfactory for some purposes, they have objectionable features limiting their utility. An objection common to reflex scanners of all previous types is that the transmission of reflected light to the light sensor required a relatively large object in the light path between the light source and the lens. In addition, increased efficiency in the system for transmitting reflected light and scanners of sizes smaller than are presently available are often desired.

The principal objective of the present invention is to provide a reflex scanner overcoming such objections, an objective attained by providing it with a coaxial lens system with a first lens controlling emitted light and a second lens focusing reflected light on one end of a light-conducting element having its other end optically connected to the light sensor. As the cross sectional area of the light-conducting element determines the field of view of the means sensing reflected light, the elements may be small ranging upward from one mil in diameter with those in the order of 0.030 inch providing satisfactory results for most uses.

Other objective of the invention are concerned with structural features ensuring simplicity of construction and the accurate registering of the light and optical axes and the accurate positioning of the light-conducting element with one end at the focal point of the second lens.

In the accompanying drawings, there is shown an embodiment of the invention illustrative of these and other of its objectives, novel features, and advantages. In the drawings:

FIG. 1 is a front view of a reflex scanner in accordance with the invention;

FIG. 2 is a section, on a substantial increase in scale, taken approximately along the indicated lines 2-2 of FIG. 1; and FIG. 3 is a fragmentary view, on the scale of FIG. 2, illustrating a lens system in accordance with another embodiment of the invention. The reflex scanner shown in the drawings consists of a housing 5 provided with a removable back 6 and having an opening 7 in it front wall for a holder 8 for the lens system and having an outer plain glass window 9 protecting the lens system which comprises planoconvex lenses 10 and 11 having their plane faces joined together in mutual contact with a common optical axis and with the lens 11 substantially smaller than the lens 10.

Within the housing 5 there is a bracket 12 to which a bracket 13 is connected by means of a screw 14 passing through an oversize hole 15 in the bracket 13 and threaded through the bracket 12. The bracket 13 supports a holder 16 in which is clamped a low voltage lamp 17 positioned at the focal point of the lens 10 which projects collimated light rays to a target area with the described connection between the brackets permitting such horizontal and vertical adjustments of the position of the lamp 17 as are necessary to ensure its proper alignment with the lens 10.

A bracket 18 within the housing 5 supports a chamber 19 for the holder 20 of a light sensitive cell 21 held in a selected vertical position by means of a set screw 22. A light-conducting element, generally indicated at 23, has one end passing through a hole in the chamber 19 and optically coupled to the cell 21 and its other end at the focal point of the lens 11. The end of the element 23 that is supported by the chamber 19 is locked thereto by a set screw 24 when it has been adjusted to position its other end at the focal point of the lens 11. The element 23 may be a quartz or clear plastic rod, or, as shown, it may consist of one or more light-conducting flexible fibers 25 encased in a tubular metal jacket 26.

The circuit leads 27 and 28 for the lamp 17 and the circuit leads 29 and 30 for the cell 21 are combined in a cable 31 secured to the housing 5 by a conventional strain relieving connection 32.

The lens system of the reflex scanner just described provides for the illumination of the target area with a collimated light ray. Where a small object is to be detected, the lens system shown in FIG. 3 is used. In that system, the holder 7 is replaced by the holder 33 in which planoconvex lens 34 and 35 are supported with their plane faces proximate and spaced apart to focus the light on a small spot close to the scanner. The lens 35 has the plane surface of a smaller planoconvex lens 11A secured to its plane surface, the function of the lens 11A being the same as that of the lens 11.

As stated, the cross-sectional area of the light-conducting element 23 determines the field of view of the light sensor 21 and such dimensions may range upwardly from one mil with an element diameter in the neighborhood of 0.030 inch providing a satisfactory field of view for a wide range of uses. It will be apparent that with the small diameter of the light-conducting element and its support by a portion remote from the optical axis, the desired objectives are attained with increased efficiency of light transmission, with a scanner construction enabling them to be made in such small sizes that they may be installed where space restrictions are severe, and with the construction enabling the field of view of the light sensing means to be within a suitably wide range with the size of the article to be detected being limited only by the sensitivity of the light sensing means.

I claim:

1. In a reflex scanner, a light source, a coaxial lens system including a first lens for directing a beam of light from said source to a target area and focused on said light source, means to sense light reflected from said area, said means including a light-conducting element disposed with one end portion coaxial with nand located between the light source and said first lens and its other end portion extending into an area remote from the path of light between the source and said first lens, light responsive means optically coupled to said last named end portion, means supporting said element and attached to a portion thereof other than its first named end portion and said lens system including a second lens between said first lens and said light source and providing a converging beam of reflected light focused on the first-named element end.

2. The reflex scanner of claim 1 in which the first and second lenses are planoconvex and are assembled with their plane surfaces in mutual contact, the second lens being smaller than the first lens.

3. The reflex scanner of claim 2 in which the lens system includes a third planoconvex lens arranged an disposed to provide a focal point for emitted light near the scanner, the first lens being a collimator.

4. The reflex scanner of claim 1 in which the light-conducting element is rigid.

5. The reflex scanner of claim 4 in which the light-conducting element is at least 1 mil in diameter.

6. The reflex scanner of claim 4 in which the light-conducting element is in the neighborhood of 0.030 inch in diameter.

6. The reflex scanner of claim 4 in which the light-conducting element comprises at least one flexible light-conducting fiber and a metal jacket therefor.

8. The reflex scanner of claim 4 in which the element is adjustable relative to its supporting means.

9. The reflex scanner of claim 4 in which the end portions of the element are angularly disposed.

10. The reflex scanner of claim 1 and a housing in which the lens system, lamp, and the means in support of the light-conducting element are mounted.

11. The reflex scanner of claim 10 in which a chamber is supported within the housing, the light sensor is within the chamber and the second named end of the light-conducting element extends into and is supported by the chamber.

12. The reflex scanner of claim 11 in which the second named light-conducting element end is rotatably and vertically adjustable.

13. The reflex scanner of claim 12 in which the light sensor and the light-conducting element are vertically adjustable as a unit.

14. The reflex scanner of claim 10 in which bracket means in the housing support the light source and are universally adjustable in a transverse vertical plane to ensure registry of the light and optical axes.